(12) United States Patent
Zazula et al.

(10) Patent No.: US 6,701,679 B2
(45) Date of Patent: Mar. 9, 2004

(54) SUPPORT STRUCTURE FOR VACUUM DUCT

(75) Inventors: Bradley Zazula, Saskatchewan (CA); R. Shawn Mooney, Saskatchewan (CA)

(73) Assignee: Brandt Industries Ltd., Saskatchewan (CA)

( * ) Notice: Subject to any disclaimer, the term of this patent is extended or adjusted under 35 U.S.C. 154(b) by 0 days.

(21) Appl. No.: 09/764,373

(22) Filed: Jan. 19, 2001

(65) Prior Publication Data
US 2002/0157207 A1 Oct. 31, 2002

(30) Foreign Application Priority Data
Jul. 24, 1998 (CA) .............................. 2243798

(51) Int. Cl.$^7$ ................................ E04F 11/00
(52) U.S. Cl. ................ 52/111; 52/645; 52/71
(58) Field of Search .............. 52/645, 111, 71; 248/49, 60, 68.1, 282.1

(56) References Cited

U.S. PATENT DOCUMENTS

| | | | |
|---|---|---|---|
| 1,054,241 A | * | 2/1913 | Richardson et al. ..... 248/282.1 |
| 2,965,304 A | * | 12/1960 | Krause ................ 239/159 |
| 3,010,013 A | | 11/1961 | Gunther et al. |
| 3,372,439 A | * | 3/1968 | Schmid ................ 24/21 |
| 3,375,624 A | * | 4/1968 | Mikulin ............... 52/109 |
| 3,382,011 A | | 5/1968 | Mascarello et al. |
| 3,470,981 A | | 10/1969 | Huxley |
| 3,550,892 A | | 12/1970 | Prepst |
| 3,690,731 A | | 9/1972 | Mytling |
| 3,887,132 A | * | 6/1975 | Widmer ............... 239/166 |
| 4,296,577 A | | 10/1981 | Schuette |
| 4,640,062 A | | 2/1987 | Rubik |
| 4,676,472 A | | 6/1987 | Kamrud, Sr. |
| 4,695,024 A | | 9/1987 | Haven |
| 4,836,486 A | | 6/1989 | Vossoughi et al. |
| 5,322,393 A | | 6/1994 | Lundquist et al. |
| 6,076,779 A | * | 6/2000 | Johnson ............... 248/49 |

FOREIGN PATENT DOCUMENTS

| | | |
|---|---|---|
| EP | 0 058 026 A1 | 8/1982 |
| GB | 2 162 616 A | 2/1986 |

* cited by examiner

*Primary Examiner*—Carl D. Friedman
*Assistant Examiner*—Basil Katcheves
(74) *Attorney, Agent, or Firm*—McFadden, Fincham; Ian Fincham

(57) ABSTRACT

A folding structure supports a duct in a generally horizontal orientation, and permits sweeping and serpentine movement of the duct. The structure is foldable for storage and transport. The structure comprises an array of panels hinged together, with the structure biased upward from its base to its free end for counteracting the weight of the loaded duct.

16 Claims, 5 Drawing Sheets

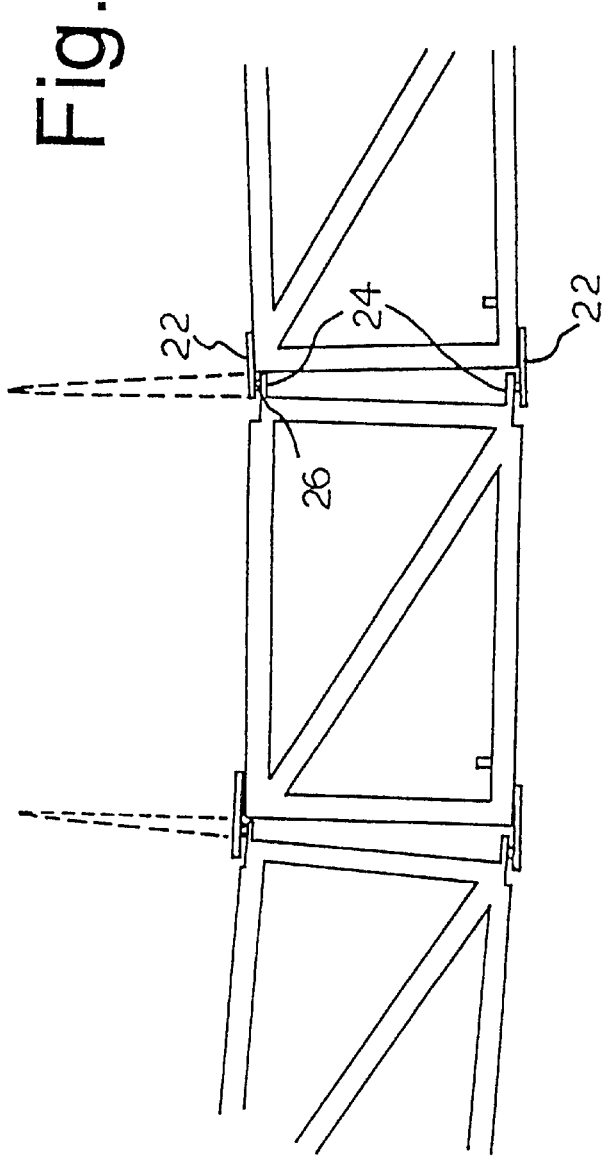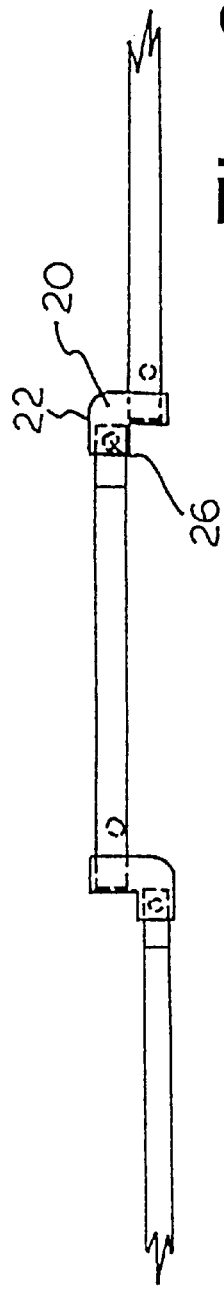

SUPPORT STRUCTURE FOR VACUUM DUCT

FIELD OF THE INVENTION

The invention relates to a cantilever-type structure for supporting a vacuum hose or other duct. Such apparatus may be used, for example, in the grain handling field to support a hose used to convey grain from a storage facility to the plenum of a grain vacuum conveyor and which is operated by an operator carrying an end of the hose by hand to manipulate and guide the hose intake.

BACKGROUND OF THE INVENTION

A variety of applications require an operator to manipulate a lengthy, heavy flexible duct or hose. In the grain handling field, hoses are typically used to convey grain by vacuum to the plenum of a vacuum conveyor, from where it is typically transported by auger or other transport means to a storage bin, truck or elsewhere. Typically, such hoses are lengthy and heavy in order to handle a large volume of grain, and are correspondingly awkward to use. Some of the weight may be borne by a harness worn by the user. However, unless a support means is employed to take up at least a portion of the weight, the weight of the duct or hose is still quite heavy. For use with a flexible duct, for example in the grain handling field, such a support must accommodate the side-to-side movement requirements of the user. In most such applications, the duct must span a relatively large horizontal distance and be capable of accommodating a large sweeping movement. However, such applications typically require only limited vertical travel of the duct. Preferably, the duct should be suspended in a generally vertical orientation such that it is elevated for substantially its entire length, with the free end of the duct depending downwardly for manipulation by the operator.

It is known to provide a support apparatus for various duct and conveyor configurations. For example, U.S. Pat. No. 3,690,731 (Mylting) and U.S. Pat. No. 3,382,011 (Mascarello et al.) disclose a flexible vacuum tube supported by a moveable boom. U.S. Pat. No. 5,322,393 (Lundquist) discloses flexible tube for use in an ore unloading apparatus, supported by a swingable horizontal boom, with a cable at end of the boom supporting the hose. The prior art supports are not well suited for applications where a relatively heavy duct must be elevated above the ground and supported over a relatively long horizontal distance, while permitting an operator to manipulate the duct in sweeping and serpentine movements. The capability to accommodate these movements is necessary in order to permit the operator to position an intake end of the duct over any desired spot over a surface, for example where the operator is vacuuming up grain distributed broadly over a surface.

In a typical grain vacuum duct application, the support must permit a large degree of side to side and back and forth mobility to the user. For this purpose, a boom-type support may be used to suspend the duct over substantially the length of the duct, with the support having the ability to flex, bend or fold in a generally horizontal plane to provide both sweeping and serpentine movement to the duct. This may be accomplished by means of articulations in the support structure that permit horizontal flex but limited vertical travel, since in the vertical plane the support must be able to support the heavy weight of a thick-walled, large diameter duct loaded with grain.

One problem that must be overcome in a hose support used for this purpose, is that a support that has the desired flexibility tends to collapse when bearing a heavy duct. This is particularly the case with a relatively long articulated support structure. Accordingly, it is desirable to provide a support having means to prevent collapse when supporting a duct for the transport of grain or other heavy material, while still capable of sweeping movement.

It is further desirable to provide a hose support that is foldable or collapsible. This feature permits the equipment to collapse into a compact unit for transport or storage.

A further desirable feature is to allow for changing the overall length of the support with relative ease to accommodate different conveying lengths. This may be accomplished with a modular arrangement whereby individual sections may be added or deleted.

Articulated and foldable supports of the prior art exist for a variety of applications. For example, U.S. Pat. No. 4,640,062 (Rubik) discloses an articulated support. Several references disclose holding arm arrangements for supporting various objects such as computer or video terminals, including U.S. Pat. No. 4,695,024 (Haven); U.S. Pat. No. 4,836,486 (Vossoughi et al.), U.S. Pat. No. 3,550,892 (Prepst). These types of supports permit the operator to position the screen in virtually any desired location within the reach of the support. However, these types of supports are not without modification capable of supporting a heavy load.

SUMMARY OF THE INVENTION

It is an object of the present invention to provide a support means, and in particular a folding support means, for supporting a flexible duct or hose. It is a further object to provide a support capable of providing horizontal support to elevate above the ground a relatively heavy duct over a relatively long span, while permitting horizontal sweeping and serpentine movement of the duct. It is a further object to provide a duct support foldable or collapsible for storage. It is a further object to provide a modular support capable of accommodating different conveying lengths.

In order to achieve the strength and rigidity required for this application, the support may conveniently comprise rectangular panels that are hinged together in a linear array. For weight reduction, the panels may comprise open truss arrangements.

It has been found that a boom type support comprised of a linear array of panels hinged together is capable of supporting a relatively lengthy and heavy duct, if the support features a gentle upward curve from its base to its end. When the duct is suspended from the support, the upward curve biases the support upwards, counteracting the weight of the loaded duct and lowering the risk of collapse of the support.

In its broadest aspect, the present invention comprises a boom type support arm for carrying an elongate flexible duct, of the type comprising an elongate structure having a proximate end for mounting to a base and a distal end, with attachment means to attaching a duct to the arm. The invention is characterized by the support arm comprising a linear array of rigid panels hingedly joined together. The hinges permit the panels to fold in on themselves such that adjacent panels may lie generally parallel to each other when folded, while permitting lateral flexibility of the support when the support is unfolded for use. When extended, the array curves slightly upwardly from the first to the second ends. The upward curve of the array may be provided by canted hinges that tilt successive panels upwardly. Preferably, the panels comprise truss panels. A duct or hose may be carried by means of slings or other attachment means that suspend the duct or hose from the support.

The individual panels are conveniently all identical in size and shape for ease of assembly. It will be seen, however, that non-identical panels may be employed.

A further convenient feature is of the use of hinges that permit the rapid attachment or detachment of individual panels. Conveniently, this may be provided by means of an eyelet and pin arrangement, whereby each panel is provided with eyelets positioned to mate with the eyelets of a neighbouring panel, and a removable pivot pin insertable through the eyelets releasably and pivotally joins the panels.

The invention further comprises the combination of a duct support as characterized above and a flexible duct or hose.

While conveniently the duct is suspended from the support, the invention is not limited to suspensive support and the support may be adapted to carry a duct by other means.

The invention will now be described by way of a preferred embodiment. It will be understood that the terms "horizontal" and "vertical" as used herein refer to the support in its ordinary, generally horizontal orientation. It will be understood that the support may be tilted away from the horizontal, and the directional references herein shall not be construed as limitative in this respect.

DESCRIPTION OF THE DRAWINGS

FIG. 5 is a side elevational view of a portion of the support;

FIG. 6 is a top elevational view of a portion of the support;

DETAILED DESCRIPTION OF THE PREFERRED EMBODIMENT

Figure 1:
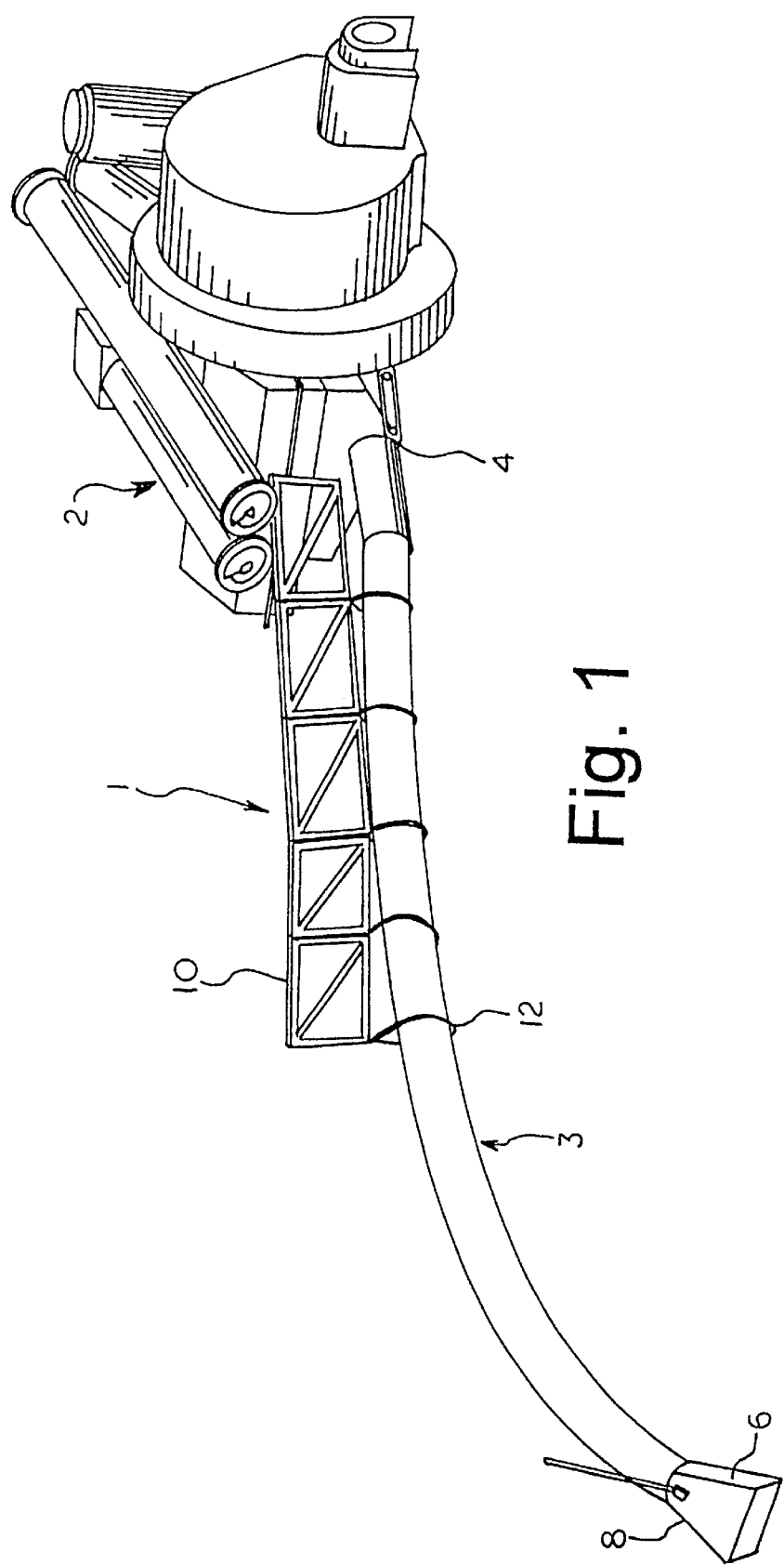
FIG. 1 is a perspective view of a duct support according to the present invention, mounted to a grain vacuum device and supporting a duct.

FIG. 1 illustrates the duct support arm 1 mounted to a grain vacuum 2 and supporting a vacuum duct 3. The vacuum duct has a proximate end 4 and a distal end 6, the proximate end communicating with the grain vacuum 2 and the distal end terminating in a vacuum head 8 forming the grain intake end. A shoulder harness (not shown) mounted to the distal end permits an operator to manipulate the vacuum head. The duct support 1 comprises a linear array of individual truss panels 10 formed from welded heavy gauge steel. In the example illustrated, the support comprises six panels 10(a)–(f). It will be understood that depending on the required length of the support, a greater or lesser number of panels may be employed. The vacuum duct 3 is releasably suspended from the support by means of slings 12 depending from the support. The slings 12 may be detached from the support by releasable attachment means, not shown, in order to permit the vacuum duct 3 to be removed for transport or storage. The slings 12 are releasably engageable to the support by any convenient releasable attachment means of any convenient type known in the art. When the vacuum duct has been removed, the support 10 may be folded into its storage and transport position as will be described below. The hinged connections between the panels 10 and between the support and base member 16 provides the support with lateral flexibility, to permit sweeping and serpentine mobility of the vacuum duct.

Figure 2:
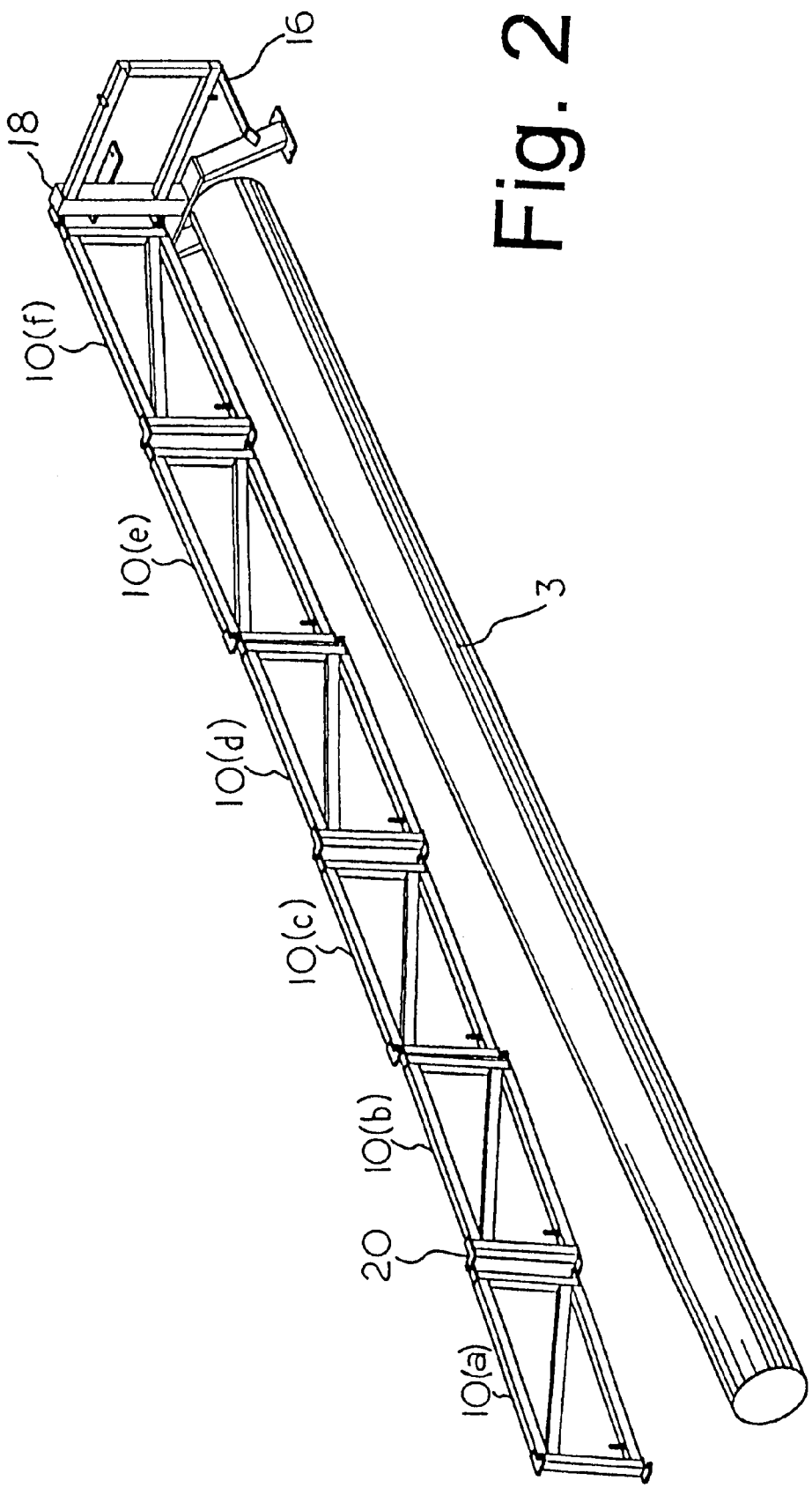
FIG. 2 is a perspective view of the support and a duct supported thereby.
Figure 3:
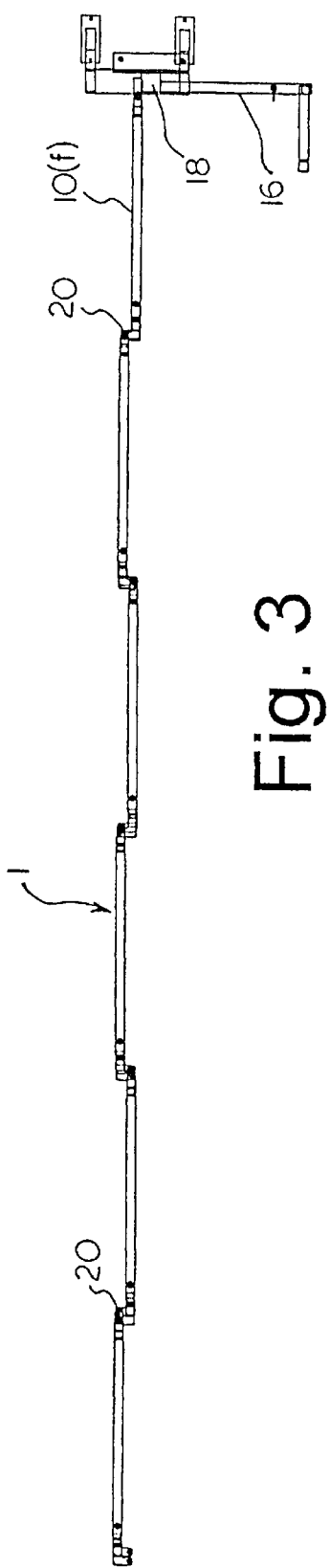
FIG. 3 is a top elevational view of the support.
Figure 4:
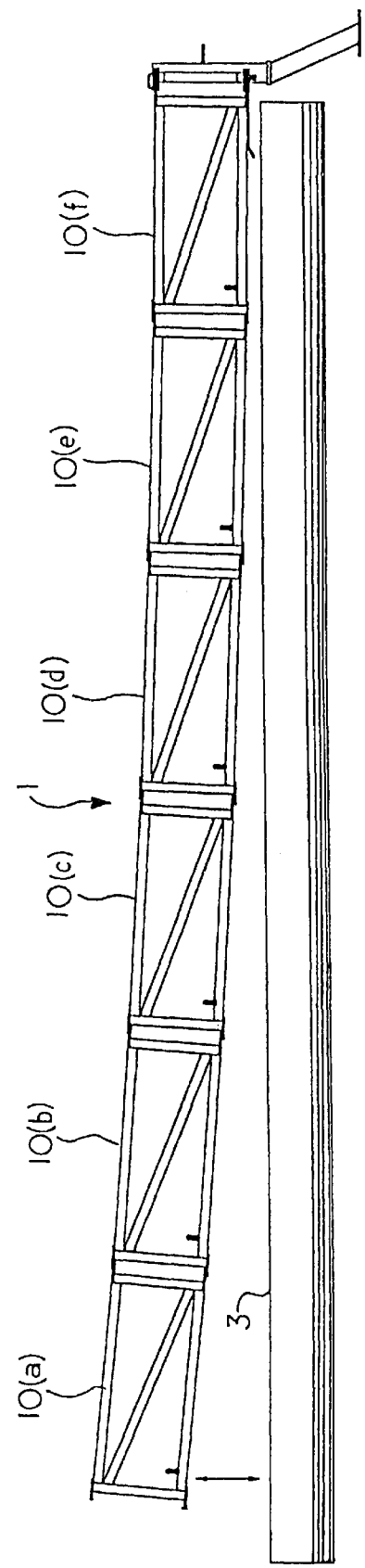
FIG. 4 is a side elevational view of the support.

Turning to FIGS. 2 to 4, the proximate end of the support is hinged to a base member 16, which in turn is mounted to the vacuum device 2. The base member 16 includes a rectangular pillar 18, to which the support 1 is hinged. The individual panels 10(a) to (f) are hinged together by means of upper and lower hinges 20 that link adjacent panels together at the upper and lower faces respectively of the panels, with the proximate panel 10(f) being hinged to the pillar 18. The hinges 20 permit pivotal rotation of adjacent panels in a generally horizontal plane only, within the limits permitted by contact between adjacent panels as they are folded together. The hinges effectively prevent movement of the panels in a vertical plane while permitting the support arm serpentine and sweeping movement in a generally horizontal plane.

As seen in greater detail in FIGS. 5 and 6, hinges 20 each comprise an L-shaped plate 22 fixedly mounted to a first panel, and a second, generally rectangular-shaped tongue 24 extending from an adjacent panel. Both of the tongue and the plate include an opening 23, with the respective openings being aligned vertically. A pivot pin 26 joins plate 22 with tongue 24. When upper and lower hinges 20 are seen in side elevational view, as in FIG. 5, upper and lower plates 22 sandwich upper and lower tongues 24, on the upper and lower faces of the panels, respectively. As seen more particularly in FIG. 6, plates 22 provide adjacent panels with a horizontally offset configuration when the panels are fully extended, such that adjacent panels lie on parallel planes.

Figure 8:
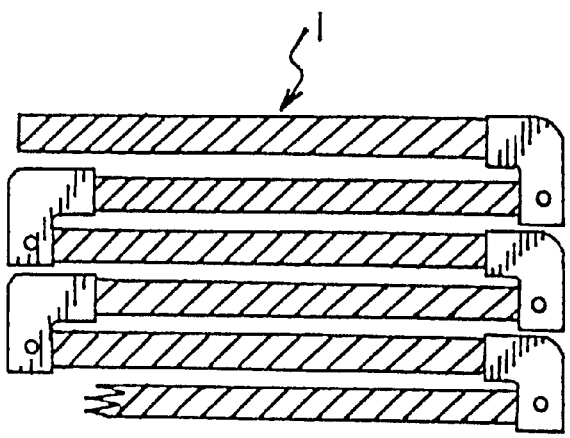
FIG. 8 is a top elevational view of the device in folded position.

The horizontal displacement between the panels permits the panels to be fully folded in on themselves, as seen in FIG. 8. The hinges 20 are canted, such that adjacent panels are slightly angled relative to each other by an angle θ. Angle θ is preferably between approximately 0.5 and 2.5 degrees and is conveniently approximately 1.0 degree. The angling of each of the panels 10(a) to (f) relative to each other approximates a gentle upward curvature of the support from its proximate end to its distal end. The upward angling of the support provides an upward bias to the vacuum duct, and helps to prevent the support from collapsing downwardly under the weight of a fully loaded vacuum duct.

Figure 7:
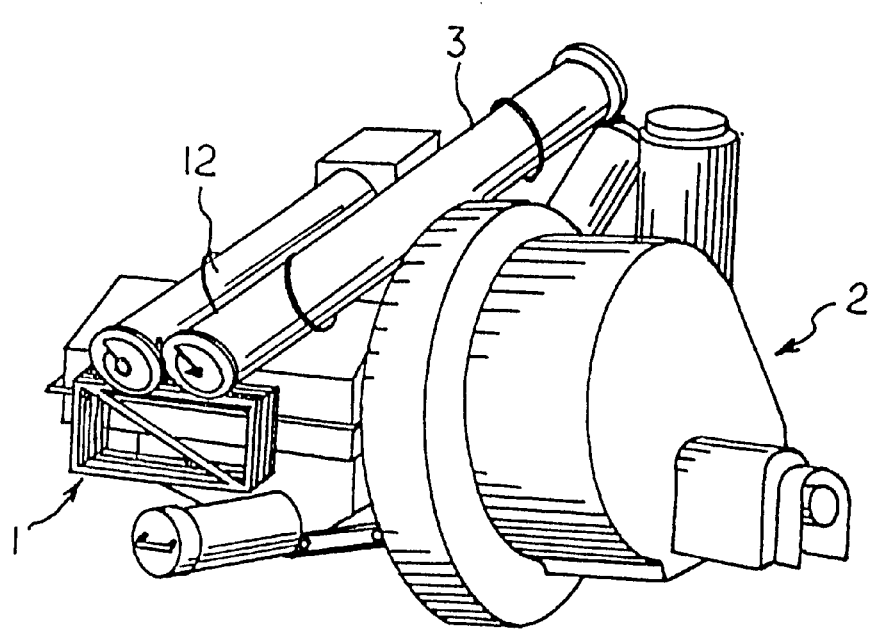
FIG. 7 is a perspective view of the support in folded position, mounted to a grain vacuum.

In the transport and storage mode shown in FIG. 7, the vacuum duct 3 is disconnected from the grain vacuum 2 and the slings 12 are disconnected from the support 1. The slings 12 may remain on the vacuum duct 3 for storage and transport. The support 1 is then folded in on itself, into the collapsed position shown in FIGS. 7 and 8. A strap or other retaining means, not shown, may be used to retain the folded support and prevent it from unfolding during transport.

It will be understood that the invention may be modified to provide a support that carries a duct alongside or above the support. As well, the upward curvature of the support may be provided by curvature the panels themselves or by the canting of only a portion of the hinges connecting the panels.

It will be understood by those skilled in the art to which this invention pertains that although a preferred embodiment has been described in full above, numerous departures and variations may be made to this embodiment, without departing from the spirit and scope of the invention as defined in the appended claims.

The embodiments of the invention in which an exclusive property or privilege is claimed are defined as follows:

1. A flexible duct support arm of the type comprising an elongate structure for holding an elongate flexible duct in a generally horizontal position and for sweeping and serpentine movement of said duct, said support arm having a proximate end for mounting to a base and a distal end, and attachment means to attach said duct to said arm, characterized by: said support arm comprising an elongate folding array of panels in end-to-end relationship when in an extended position and a side-by-side relationship when in a folded position, said panels being joined together to permit pivotal movement of said panels relative to each other in a generally horizontal plane, said panels angling progressively upwardly from said proximate end to said distal end wherein selected pairs of panels are free to assume different angles with respect to each other than other pairs of panels.

2. A support arm as in claim 1, wherein said panels comprise truss panels.

3. A support arm as in claim 1, wherein said panels are hinged together by means of hinges canted to provide progressive upward angling between said panels, said panels being angled relative to each other by an angle $\theta$.

4. A support arm as in claim 3, wherein $\theta$ is between 0.5 and 2.5 degrees.

5. A support arm as in claim 1, wherein adjacent of said panels are horizontally offset whereby adjacent panels lie in a parallel and side by side relationship when folded in on themselves.

6. A support arm as in claim 1, wherein said attachment means comprise releasable attachment means.

7. A support arm as in claim 1, wherein said support is adapted for the suspension of a duct from said support.

8. A support arm as in claim 7, wherein said attachment means comprises at least one sling for the suspension of said duct from said support, said sling comprising a sling body for encircling said duct and an attachment member for releasable engagement to said duct support.

9. An apparatus comprising in combination an elongate flexible duct supported by a duct support arm for sweeping and serpentine movement of said duct of the type, comprising an elongate structure for holding said duct in a generally horizontal position and having a proximate end for mounting to a base and a distal end, said support arm further comprising attachment means to attach said duct to said support arm, characterized by: said support arm comprising an elongate folding array of panels in end-to-end relationship when in an extended position and a side-by-side relationship when in a folded position, said panels being joined together to permit pivotal movement of said panels relative to each other in a generally horizontal plane, said panels angling progressively upwardly from said proximate end to said distal end wherein selected pairs of panels are free to assume different angles with respect to each other than other pairs of panels.

10. Apparatus as in claim 9, wherein said panels comprise truss panels.

11. Apparatus as in claim 9, wherein said panels are hinged together by means of hinges canted to provide progressive upward angling between said panels, said panels being angled relative to each other by an angle $\theta$.

12. Apparatus as in claim 11, wherein $\theta$ is between 0.5 and 2.5 degrees.

13. Apparatus as in claim 9, wherein adjacent of said panels are horizontally affect to whereby adjacent of said panels lie in a parallel and side by side relationship when folded in on themselves.

14. Apparatus as in claim 9, wherein said attachment means comprise releasable attachment means.

15. Apparatus as in claim 9, wherein said duct is suspended from said support arm.

16. Apparatus as in claim 15, wherein said duct is suspended from said support arm by releasable attachment means comprising at least one sling, said sling comprising a sling body for encircling said duct and attachment member for releasable engagement to said duct support arm.

* * * * *

UNITED STATES PATENT AND TRADEMARK OFFICE
CERTIFICATE OF CORRECTION

PATENT NO. : 6,6701,679 B2
DATED : March 9, 2004
INVENTOR(S) : Bradley Zazula and R. Shawn Mooney It is certified that error appears in the above-identified patent and that said Letters Patent is hereby corrected as shown below:

<u>Title page,</u>
Item [22], PCT filed, should read -- July 23, 1999 --
Item [86], PCT No., should read
-- PCT/CA99/00676
  § 371 (c)(1),
  (2),(4) Date:  January 19, 2001 --
Item [87], should read -- PCT Pub. Date:  WO 00/06477
                         PCT Pub. Date:  10 February 2000 --

Signed and Sealed this

Sixth Day of July, 2004

JON W. DUDAS
*Acting Director of the United States Patent and Trademark Office*